(12) United States Patent
Korthuis et al.

(10) Patent No.: US 8,299,708 B2
(45) Date of Patent: Oct. 30, 2012

(54) PIXEL STRUCTURES

(75) Inventors: Vincent C Korthuis, Corvallis, OR (US); Cary G Addington, Albany, OR (US); Peter S Nyholm, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

(21) Appl. No.: 12/911,218

(22) Filed: Oct. 25, 2010

(65) Prior Publication Data
US 2012/0098406 A1 Apr. 26, 2012

(51) Int. Cl.
*H01J 17/49* (2006.01)
(52) U.S. Cl. ..................................... 313/582; 359/296
(58) Field of Classification Search .................. 359/296; 174/250, 255, 261, 262; 29/825, 829, 846; 313/582
See application file for complete search history.

(56) References Cited

U.S. PATENT DOCUMENTS

| | | | |
|---|---|---|---|
| 5,545,280 A | 8/1996 | Wenz | |
| 6,285,001 B1 | 9/2001 | Fleming et al. | |
| 7,470,386 B2 | 12/2008 | Kang et al. | |
| 7,476,982 B2 | 1/2009 | Autumn et al. | |
| 7,709,352 B2 | 5/2010 | Cohen et al. | |
| 2007/0235902 A1 | 10/2007 | Fleming et al. | |
| 2008/0158652 A1* | 7/2008 | Toyoda | 359/296 |

FOREIGN PATENT DOCUMENTS

DE 102007006634 A1 8/2008

OTHER PUBLICATIONS

Thomas, et al. "Surface Modification of Polymers and Ceramics Induced by Excimer Laser Radiation", Laser Ablation of Electronic Materials, Basic Mechanisms and Apps 1992.
Baburaj, et al. "Enhancement of Adhesive Joint Strength by Laser Surface Modification", International Journal of Adhesion and Adhesives, vol. 27, Issue 4, Jun. 2007, 268-276.
Zhang, et al. "Enhancement of Ceramic-to-Metal Adhesive Bonding by Excimer Laser Surface Treatment", Materials Letters, vol. 30, Issues 5-6, Apr. 1997, pp. 327-332.
Queiroz, et al. "Laser Surface Modification of Hydroxyapatite and Glass-Reinforced Hydroxyapatite", Biomaterials, 25 (2004), pp. 4607-4614.

* cited by examiner

Primary Examiner — Anne Hines

(57) ABSTRACT

In an embodiment, a pixel structure has an electrical conductor, a dielectric on the electrical conductor, a plurality of ribs on the dielectric, and a plurality of discrete protrusions protruding from a surface of each of the ribs. The plurality ribs define a plurality of compartments on the dielectric.

19 Claims, 9 Drawing Sheets

PIXEL STRUCTURES

BACKGROUND

Some electro-optical displays, such as electrophoretic displays (e.g., sometimes referred to as electronic paper), may use fluids having electrically charged particles therein, such as electrophoretic inks, to create images. For example, the electrically charged particles may be electrically charged pigment particles.

In some displays, the electrophoretic ink may be contained between a pair of conductors, e.g., electrodes, one or both of which may be substantially transparent. When a voltage is applied across the conductors, the particles are drawn to the conductor having the opposite charge from the particles. For example, this movement may be referred to as electrophoresis.

Some electrophoretic displays may include a plurality of pixels for forming images on a viewing side thereof. Each pixel may be a closed container that contains electrophoretic ink between the pair of conductors.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, chemical, electrical or mechanical changes may be made without departing from the scope of the present disclosure. The following detailed description is, therefore, not to be taken in a limiting sense.

Whenever used herein, terms such as upper or lower top or bottom refer to relative placements in the frames of reference of the figures and do not require any particular absolute orientation.

Figure 1:
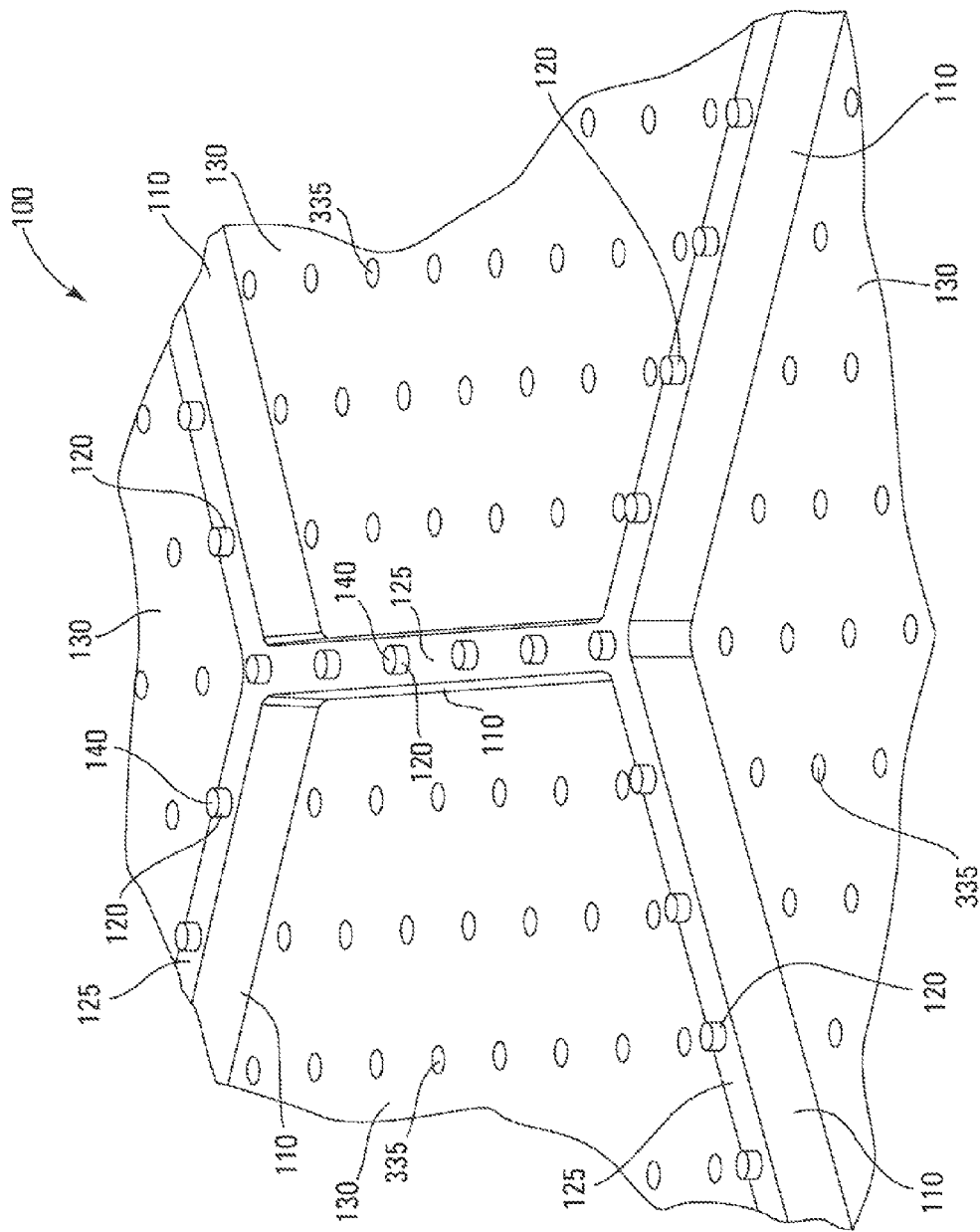
FIG. 1 is a perspective view of a pixel structure, according to an embodiment.

FIG. 1 is a perspective view of a portion of a pixel structure 100 that may form a portion of a display, such as an electro-optical display, e.g., an electrophoretic display. Pixel structure 100 may include a plurality of ribs 110. A plurality of discrete protrusions 120 may protrude from a surface 125, e.g., an upper surface, of each of ribs 110. The plurality ribs 110 may define a plurality of open-ended compartments 130 (e.g., that may be referred to as wells) in pixel structure 100, where the compartments 130 respectively correspond to pixels of the display and where the ribs 110 may form sidewalls of the respective compartments 130. For example, a pixel may include one or more compartments 130. As such, pixel structure 100 may constitute a single pixel having a plurality of compartments 130 for some embodiments.

Each compartment 130 may contain fluid having electrically charged particles therein, such as electrophoretic ink. Ribs 110 may be fastened to a conductor, e.g., an electrode, (not shown in FIG. 1) of the display, e.g., using an adhesive, such as adhesive 210 in FIG. 2A.

Discrete protrusions 120 increase the wettability at the top of each of ribs 110 by increasing the overall surface area atop each rib 110 that is available for wetting by adhesive 210. For example, the overall surface area atop each rib 110 that is available for wetting by adhesive 210 may include the area of the surfaces of protrusions 120, e.g., the area of the surfaces of ends 140 (e.g., the upper ends) of protrusions 120 and the area of the side surfaces of protrusions 120, and the area of surface 125 (e.g., the area the portion of surface 125 of each rib 110 that is not covered by protrusions 120). The increased overall surface area acts to increase the adhesive force between the top of each rib and adhesive 210. This acts to retain adhesive 210 on top of each rib 110, as shown in FIG. 2A.

For some embodiments, the top each rib 110 may have a greater surface energy than the sidewalls of the respective rib. For example, the surface energy of the top of each rib 110 may be increased by laser treatment.

For example, the top surface of each rib may be roughened by laser ablation. That is, the surfaces of ends 140 of protrusions 120, the side surfaces of protrusions 120, and/or surface 125, e.g., the portion of surface 125 not covered by protrusions 120, may be roughened by laser ablation for some embodiments. This means that the surfaces of ends 140 of protrusions 120, the side surfaces of protrusions 120, and/or the portion of surface 125 not covered by protrusions 120 may have a greater surface energy than the sides of ribs 110. The increased surface energy acts to retain adhesive 210 on top of each rib 110.

Figure 2A:
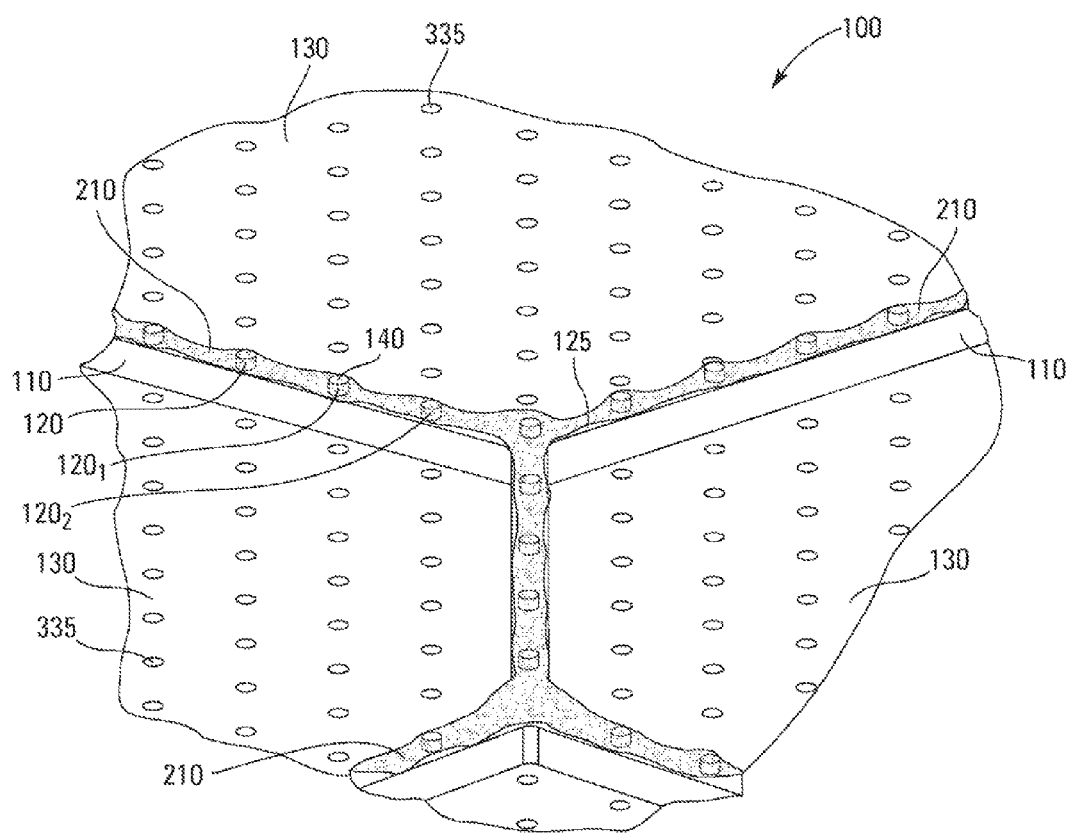
FIG. 2A is a perspective view, showing discrete protrusions on ribs of a pixel structure retaining adhesive, according to another embodiment.
Figure 2B:
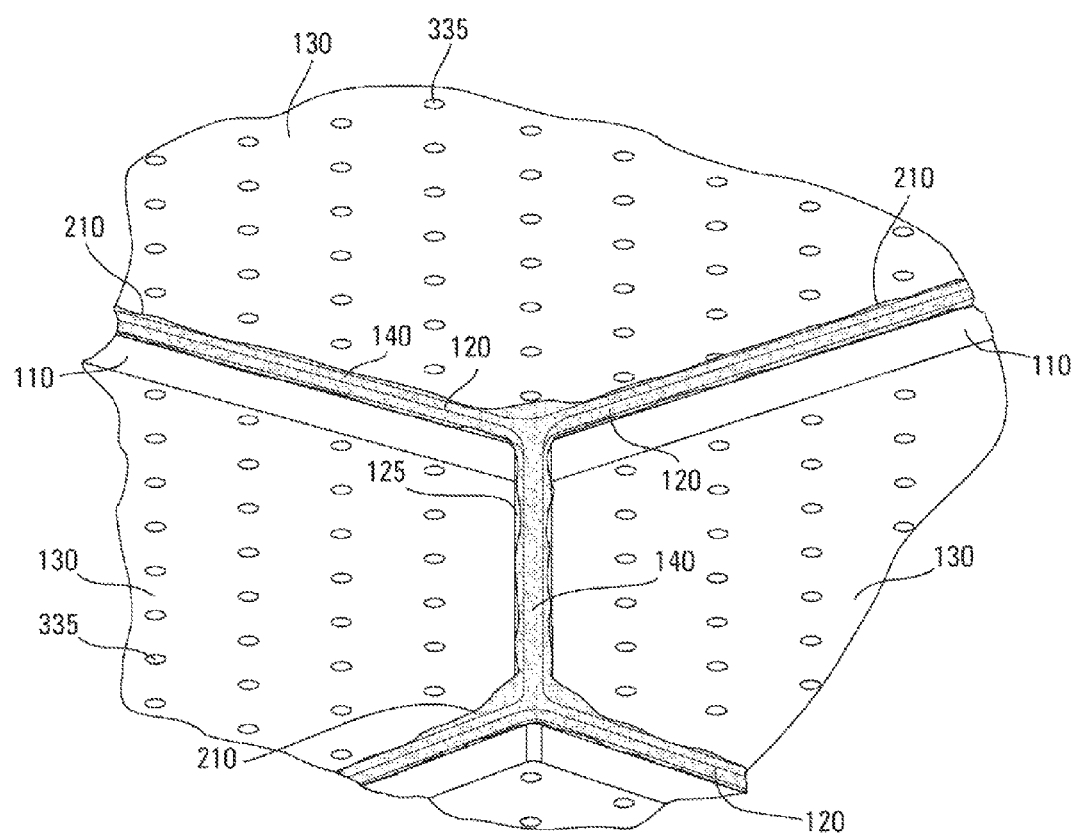
FIG. 2B is a perspective view, showing a continuous protrusion retaining adhesive on a ribbed structure of a pixel structure, according to another embodiment.

Although FIGS. 1 and 2A illustrate that protrusions 120 may be discrete protrusions, in other embodiments, a single, continuous protrusion 120 may protrude from the surface 125 of a ribbed structure formed by ribs 110, as shown in FIG. 2B. The single, continuous protrusion 120 increases the wettability at the top of the ribbed structure by increasing the overall surface area atop the ribbed structure that is available for wetting by adhesive 210. For example, the overall surface area atop the ribbed structure that is available for wetting by adhesive 210 may include the area of the surface of the single, continuous protrusion 120, e.g., the area of the surface of end 140 of the single, continuous protrusion 120 and the area of the side surfaces of the single, continuous protrusion 120, and the area of the portion of surface 125 that is not covered by the single, continuous protrusion 120. The increased overall surface area acts to increase the adhesive force between the top of the ribbed structure and adhesive 210. This acts to retain adhesive 210 on top of the ribbed structure, as shown in FIG. 2B.

For some embodiments, the top of the ribbed structure, with the single, continuous protrusion 120 thereon, may have a greater surface energy than the sidewalls of the ribbed structure. For example, the surface energy of the top of the ribbed structure may be increased by laser treatment. For example, the top surface of the ribbed structure may be roughened by laser ablation. That is, the surface of end 140 of the single, continuous protrusion 120, the side surfaces of the single, continuous protrusion 120, and/or the portion of surface 125 not covered by protrusion 120 may be roughened by laser ablation for some embodiments. This means that the surface of end 140 of the single, continuous protrusion 120, the side surfaces of the single, continuous protrusion 120, and/or the portion of surface 125 not covered by protrusions 120 may have a greater surface energy than the sides of the ribbed structure. The increased surface energy acts to retain adhesive 210 on top of the ribbed structure.

The increased surface energy and/or the increased adhesion force advantageously acts to retain wet and, e.g., uncured, adhesive on top of each rib 110 of the pixel structure in FIG. 2A or on top of the ribbed structure of the pixel structure in FIG. 2B, thereby advantageously substantially preventing (e.g., preventing) adhesive 210 from running down the sides of a respective rib 110 in FIG. 2A or the sides of the ribbed structure of FIG. 2B (e.g., by wicking) and into compartments 130, and thus the pixels, as sometimes occurs for some conventional pixel structures where there are no protrusions protruding from the upper surfaces of such ribs. When adhesive runs into compartments, as sometimes occurs for conventional pixel structures that do not have protrusions on their ribs, the presence of the adhesive at the base of a rib reduces the surface area, and thus the viewing area, of the pixels and can cause the viewing area to appear lighter.

Successively adjacent protrusions 120, such as successively adjacent protrusions $120_1$ and $120_2$ in FIG. 2A, may be configured to retain wet adhesive therebetween. The surface tension of adhesive 210 may act to retain adhesive 210 between adjacent protrusions $120_1$ and $120_2$ and on the surface 125 of each rib 110. For example, the surface tension of adhesive 210, the distance between adjacent protrusions $120_1$ and $120_2$, and/or the viscosity of adhesive 210 allow adhesive 210 to extend from protrusion $120_1$ to adjacent protrusion $120_2$ and to be retained between protrusions $120_1$ and $120_2$.

As discussed in more detail below, adhesive 210 may be wicked between adjacent discrete protrusions 120 in a direction, e.g., substantially perpendicular to the surface 125 of a respective rib 110, from ends 140, such as tips, of protrusions 120 toward the base of the protrusions 120, e.g., at a surface 125 of a respective rib 110. For example, the surface tension of adhesive 210, the distance between adjacent protrusions $120_1$ and $120_2$, and/or the viscosity of adhesive 210 allow adhesive 210 to be wicked between adjacent 120 protrusions in a direction from ends 140 toward the base of the protrusions 120.

Adhesive 210 may also be wicked from a protrusion 120 to an adjacent protrusion 120. For example, adhesive 120 may be wicked from protrusion $120_1$ to successively adjacent protrusion $120_2$, e.g., in a direction substantially parallel to the surface 125 of a respective rib 110. For example, the surface tension of adhesive 210, the distance between adjacent protrusions $120_1$ and $120_2$, and/or the viscosity of adhesive 210 allow adhesive 210 to be wicked from a protrusion 120 to an adjacent protrusion 120, e.g., that may be on the same rib 110 or an adjacent rib 210, as shown in FIG. 2A.

For other embodiments, adhesive 210 may be wicked along the length of the single, continuous protrusion 120, substantially parallel to the surface 125 of a respective rib 110, as shown in FIG. 2B.

Figure 3:
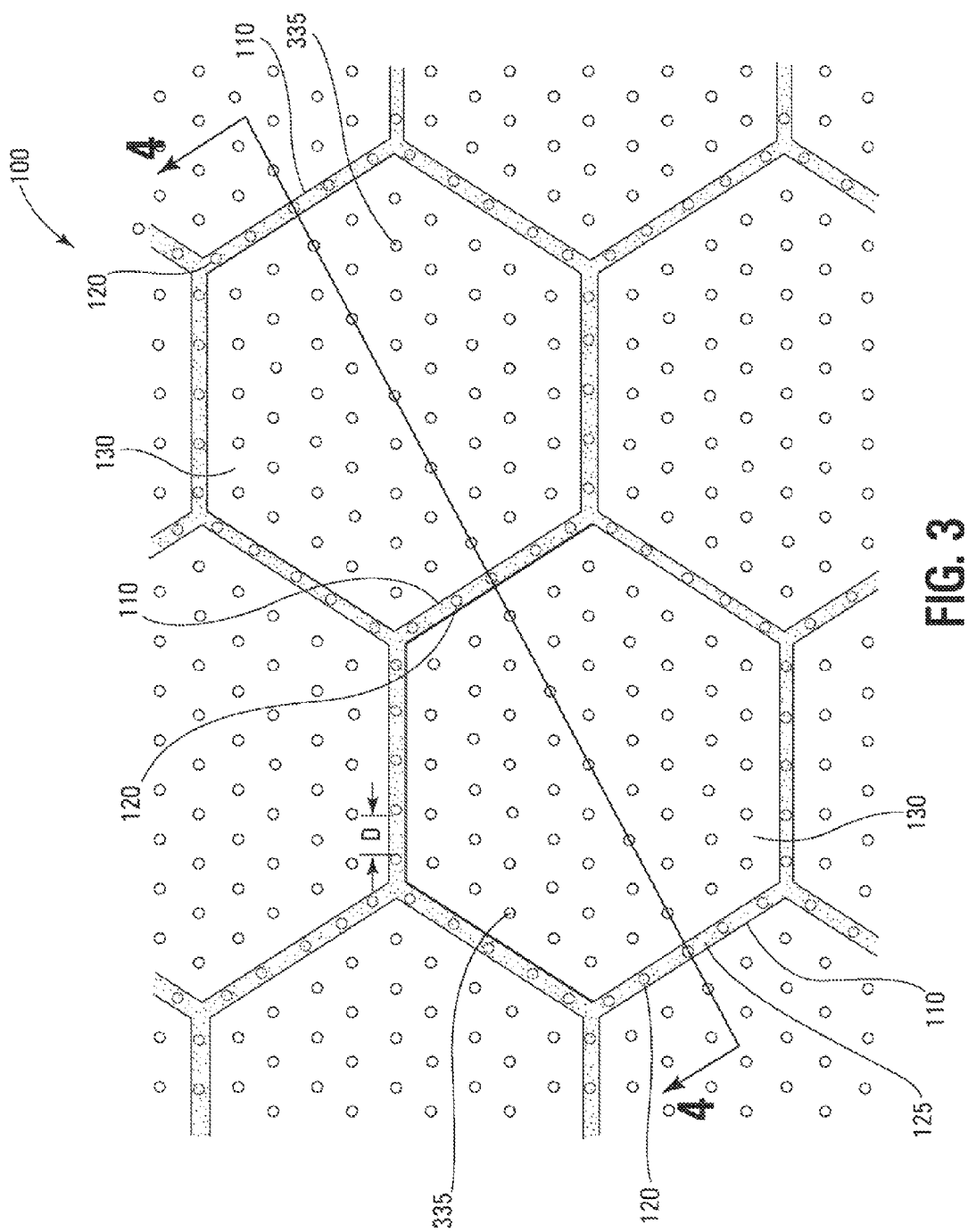
FIG. 3 is a plan view of a pixel structure, according to another embodiment.
Figure 4:
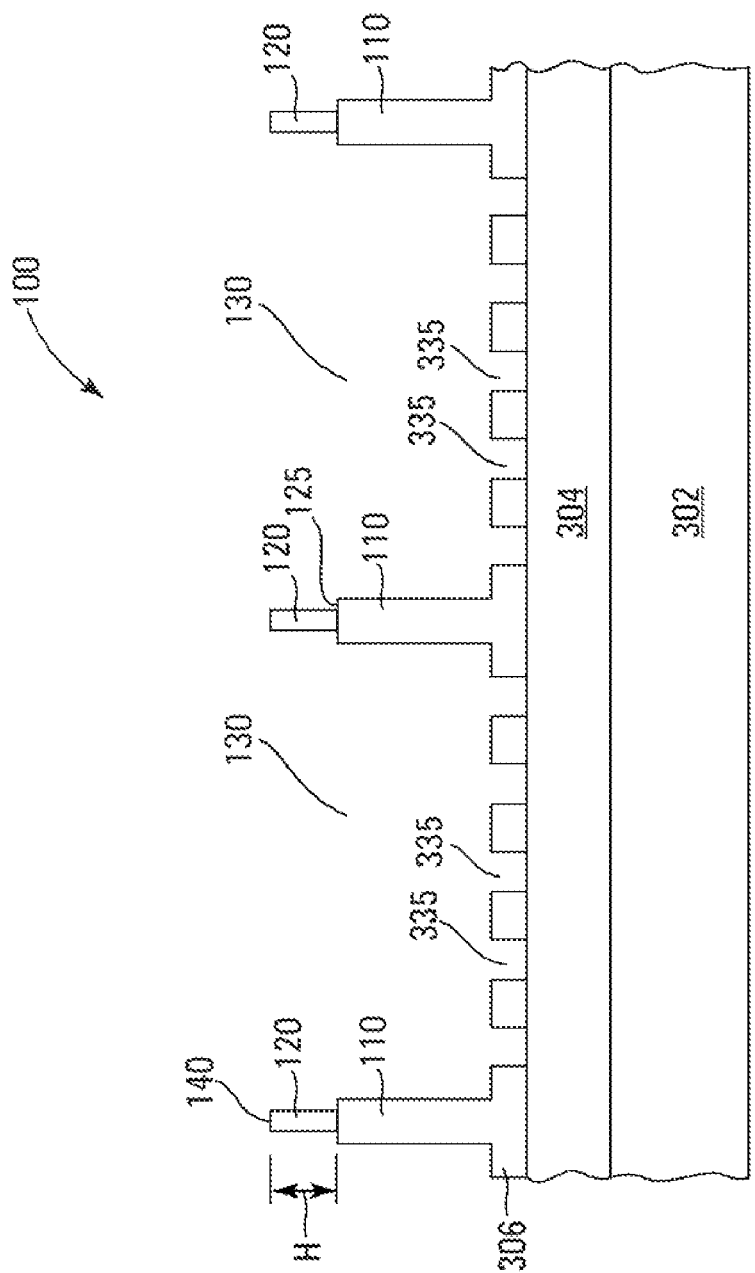
FIG. 4 is a cross-sectional view taken along line 4-4 in FIG. 3.

FIG. 3 is a plan view of pixel structure 100. FIG. 4 is a cross-sectional view (with cross-hatching omitted) taken along line 4-4 in FIG. 3. Pixel structure 100 may include a substrate 302, e.g., of polyester, polyethylene naphthalate (PEN), etc. An electrical conductor, e.g., an electrode, 304, such as indium tin oxide (ITO), may be on substrate 302, as shown in FIG. 4. A dielectric 306 may be on conductor 304. Dielectric 306 may be an ultraviolet light (UV) curable resin, such as aliphatic urethane diacrylate, e.g., EBECRYL® 8402 that has a photoinitiator. For example, in general, dielectric 306 may include a base resin of an oligomer used in combination other acrylates to adjust viscosity, photoinitiators to adjust cure, and adhesion promoters to adjust tack.

The plurality of the ribs 110 may be on dielectric 306. A plurality of openings 335 may extend through dielectric 306 to conductor 304 so as to expose portions of the electrical conductor 304, as shown in FIG. 4. For example, a plurality of openings 335 may extend through dielectric 306 at the bottom of each of compartments 130. For some embodiments, dielectric 306, the ribs 110, and protrusions 120 may be the same material.

For some embodiments, ribs 110, protrusions 120, and openings 335, may be formed in dielectric 306 by embossing, e.g., using roll-to-roll processing. For example, substrate 302, conductor 304, and dielectric 306 may constitute a web, and dielectric 306 may be embossed by passing the web through a pair of rollers. As such, pixel structure 100 may be considered a web.

Dielectric 306 may be UV cured during embossing, meaning that dielectric 306 shown in FIGS. 3 and 4 may be UV cured. For some embodiments, substrate 302, conductor 304, and dielectric 306 may be substantially transparent (e.g., transparent) to light and/or flexible, meaning that pixel structure 100 may be substantially transparent (e.g., transparent) and/or flexible. For example, pixel structure 100 may be a flexible web.

For some embodiments, a height H (FIG. 4) of protrusions 120 may range from one (1) micron to ten (10) microns. For example, the height H may be defined as the distance from the base of a respective protrusion 120, e.g., the surface 125 of a respective rib 110, to the end 140 of a respective protrusion 120.

A distance D (FIG. 3) from a discrete protrusion 120 to a successively adjacent discrete protrusion 120 may be such that adhesive 210 can be retained between the adjacent protrusions 120 by the surface tension of adhesive 210. For example, the distance D may range from one (1) micron to 25 microns. For some embodiments, the distance D may range from seven (7) microns to 25 microns, while for other embodiments distance D may range from seven (7) microns to 15 microns. In other words, a distance D ranging from (1) micron to 25 microns may allow adhesive 210 to be retained between the adjacent protrusions by the surface tension of adhesive 210.

Figure 5:
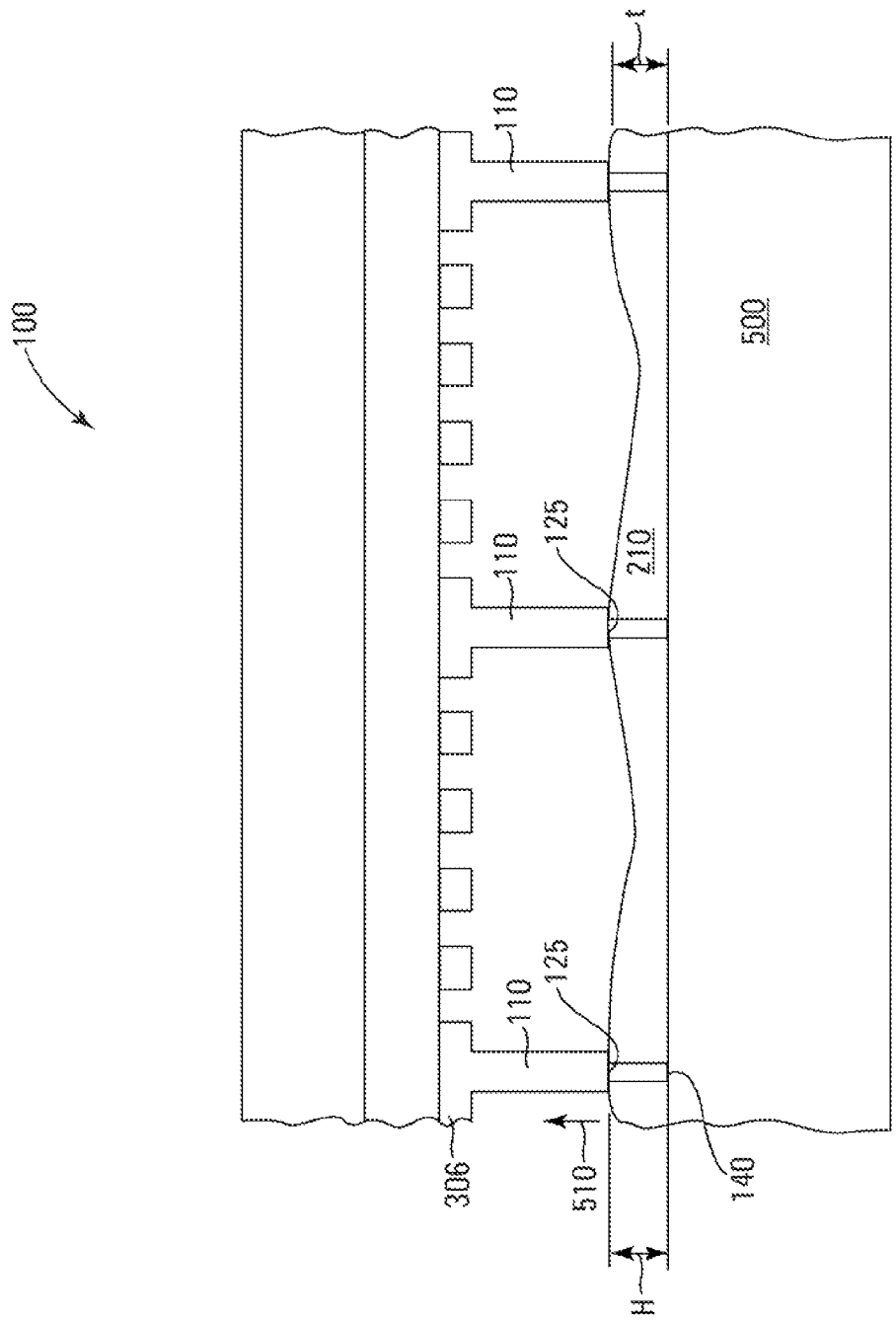
FIG. 5 is a cross-sectional view illustrating adhesive being applied to a pixel structure, according to another embodiment.

FIG. 5 is a cross-section (with cross-hatching omitted) illustrating adhesive 210 being applied to protrusions 120. For example, a thickness t of adhesive 210 may be applied to a substrate 500. Pixel structure 100 may then be pressed into substrate 500 so that protrusions 120 pass through adhesive 210, e.g., until the ends 140 of protrusions 120 contact the upper surface of substrate 500. For other embodiments, a thin layer of adhesive 210 may be between the ends 140 of protrusions 100 and the upper surface of substrate 500. For embodiments, where pixel structure 100 may be a web, substrate 500 may be a web, and pixel structure 100 and substrate 500, with adhesive 210 thereon, may be passed through a pair of rollers in a roll-to-roll process for applying adhesive 210 to protrusions 120.

The thickness t of adhesive 210 may be less than, e.g., as shown in FIG. 5, or substantially equal to the height H of protrusions 120. When the thickness t of adhesive 210 is less than the height H of protrusions 120, adhesive 210 may wick between successively adjacent protrusions 120 in a direction, substantially perpendicular to the surface 125 of a respective rib 110, from the ends 140 of the adjacent protrusions 120 toward the base, e.g., at the surface 125 of the respective rib 110, of the adjacent protrusions 120, as indicated by arrow 510 in FIG. 5.

Figure 6:
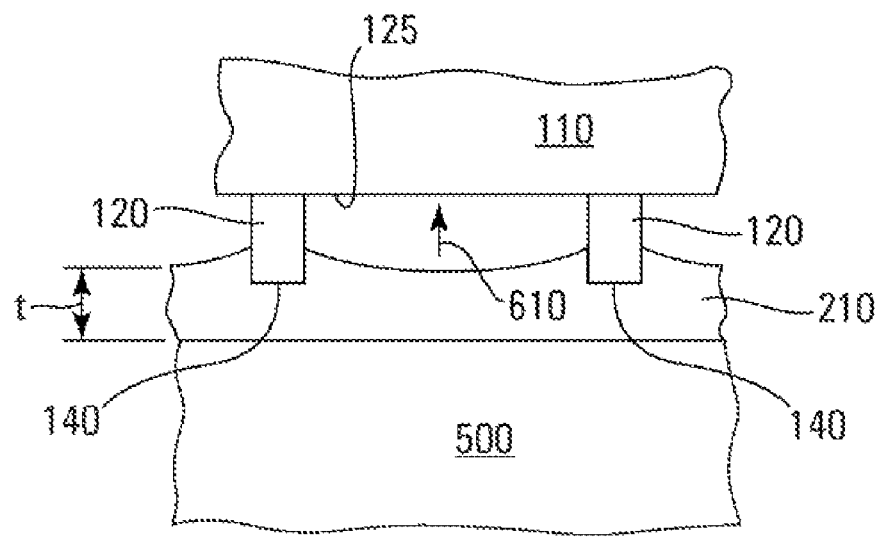
FIG. 6 is a cross-sectional view, showing wicking of adhesive, according to another embodiment.

FIG. 6 is a cross-sectional view (with cross-hatching omitted) of a rib 110, showing the wicking of adhesive 210 between successively adjacent discrete protrusions 120 in response to r ends 140 contacting adhesive 210. Adhesive 210 may wick in a direction, substantially perpendicular to the surface 125 of the respective rib 110, from ends 140 of the adjacent protrusions 120 toward the base of the adjacent protrusions 120, as indicated by arrow 610. The wicking shown in FIG. 6 may be substantially the same as the wicking that may occur when the thickness t of adhesive 210 is less than the height H of protrusions 120, as described above in conjunction with FIG. 5.

Figure 7:
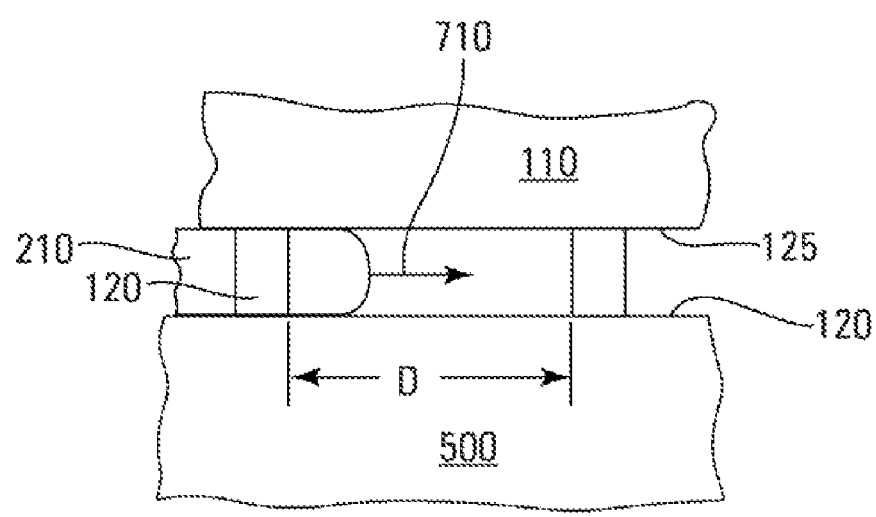
FIG. 7 is another cross-sectional view, showing wicking of adhesive, according to another embodiment.

Adhesive 210 may wick in a direction substantially parallel to an surface 125 of a respective rib 110 from one protrusion 120 that is wetted by adhesive 210 to a successively adjacent protrusion 120, e.g., that might not be wetted by adhesive 210, as indicated by arrow 710 in FIG. 7, a cross-sectional view (with cross-hatching omitted). For example, adhesive 210 may wick from the one protrusion 120 to the successively adjacent protrusion 120 when the distance D from the one discrete protrusion 120 to the successively adjacent discrete protrusion 120 is (1) micron to 25 microns, the viscosity of the adhesive is 200 to 1000 centipoise, and/or the surface tension of the adhesive is 25 to 40 dynes/cm. In other words, the distance D of (1) micron to 25 microns, the viscosity of 200 to 1000 centipoise, and/or surface tension of 25 to 40 dynes/cm may allow adhesive 210 to wick from the one protrusion 120 to the successively adjacent protrusion 120.

For other embodiments, the viscosity of the adhesive may be 300 centipoise and the surface tension of the adhesive may be 30 dynes/cm. Non-limiting examples of suitable adhesives may include photo curable resins, such as UV curable SU 8, UV curable aliphatic urethane diacrylate, e.g., EBECRYL® 8402, etc.

Pixel structure 100 is then removed from substrate 500. After pixel structure 100 is removed from substrate 500, discrete protrusions 120 can retain the wet, and, e.g., uncured, adhesive 210 therebetween, as best seen in FIG. 2A. For example, adhesive 210 may be retained between successively adjacent discrete protrusions 120 when the distance D from one of the protrusions 120 to the successively adjacent protrusion 120 is (1) micron to 25 microns, the viscosity of adhesive 210 is 200 to a 1000 centipoise, and/or the surface tension of adhesive 210 is 25 to 40 dynes/cm. In other words, the distance D of (1) micron to 25 microns, the viscosity of 200 to a 1000 centipoise, and/or surface tension of 25 to 40 dynes/cm allow adhesive 210 to extend from protrusion $120_1$ to adjacent protrusion $120_2$, as shown in FIG. 2A.

For embodiments with a single, continuous protrusion 120 on the rib structure of the pixel structure of FIG. 2B, the single, continuous protrusion 120 may retain the wet, and, e.g., uncured, adhesive 210 thereon.

The distance D of one (1) micron to 25 microns, the viscosity of 200 to a 1000 centipoise, and/or surface tension of 25 to 40 dynes/cm allow adhesive 210 to be wicked between protrusion $120_1$ and adjacent protrusion $120_2$ in a direction from ends 140, toward the base of the protrusions $120_1$ and $120_2$. For some embodiments, a thickness of the wet, uncured adhesive 210 may cover the ends 140 of at least some of the discrete protrusions 120, as shown in FIG. 2A.

Figure 8:
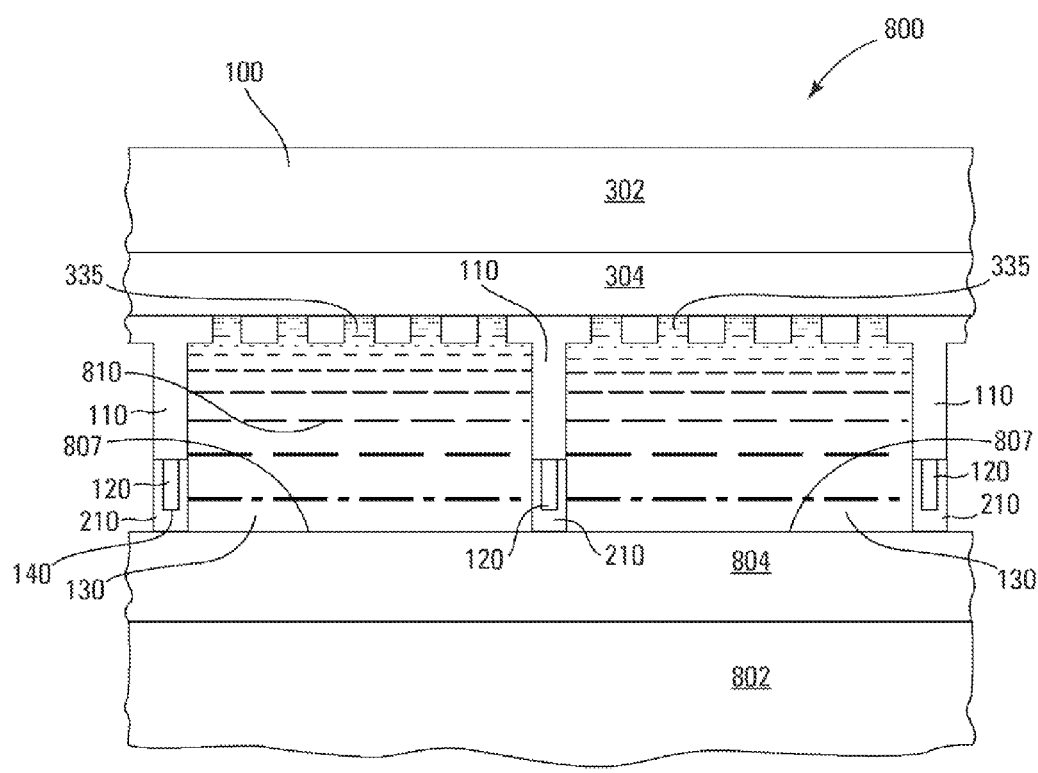
FIG. 8 is a cross-sectional view of a display, according to another embodiment.

After removing pixel structure 100 from substrate 500, pixel structure 100, with wet adhesive retained between protrusions 120, as shown in FIGS. 2A and 2B, is positioned over an electrical conductor, e.g., an electrode, 804 that is on a substrate 802, as shown in FIG. 8, to form a display 800, such as an electro-optical display, e.g., electrophoretic display. For some embodiments, conductor 804 and substrate 802 may respectively follow the same material guidelines as conductor 304 and substrate 302. For example, conductor 804 and substrate 802 may respectively be of substantially the same materials as conductor 304 and substrate 302. As such, conductor 804 and substrate 802 may be substantially transparent to light for some embodiments.

A fluid 810, e.g., containing charged particles, such as charged pigments, may be on conductor 804. Fluid 810 may be a dielectric liquid containing the charged particles, for some embodiments. For example, fluid 810 may be electrophoretic ink.

When pixel structure 100 is over conductor 804, the wet adhesive 210 may contact conductor 804, and ribs 110, with the protrusions 120 protruding therefrom, pass through fluid 810 so that conductor 804 closes the open end of compartments 130 to form closed compartments 130 within display 800. For example, each closed compartment 130 forms a pixel or a portion of a pixel, containing fluid 810. Stated in another way, ribs 110 and conductor 804 define a plurality of closed compartments 130 between conductors 304 and 804 corresponding to a plurality of pixels 830 of the display 800. For some embodiments, the display 800 may correspond to a portion of a single pixel.

Note that adjacent (e.g., neighboring) compartments 130, and thus adjacent (e.g., neighboring) pixels, for some embodiments, may share a common rib 110, as shown in FIGS. 1-5 and 8. For example, a rib 110 may from a common sidewall for adjacent compartments 130. In other words ribs 110 separate adjacent compartments 130, and thus adjacent pixels, for some embodiments, from each other.

A thickness of adhesive 210 may be between the ends 140 of at least some of discrete protrusions 120 of the pixel structure 100 of FIG. 2A and a surface 807 (e.g., an upper surface) of conductor 804 to which protrusions 120 adhere. After positioning the pixel structure 100 over conductor 804, as shown in FIG. 8 for pixel structure 100, adhesive 210 may be cured, e.g., by passing UV light through substrate 302, conductor 304, and liquid 810 and onto adhesive 210 and/or by passing UV light through substrate 802 and conductor 804 and onto adhesive 210. When the pixel structure 100 is over conductor 804, as shown in FIG. 8, the openings 335 that extend through dielectric 306 to conductor 304 allow the portions of conductor 304 exposed by the openings 335 to be exposed to, e.g., contacted by, fluid 810.

For some embodiments, conductor 804 and substrate 802 may be flexible and may constitute a web. For embodiments, where pixel structure 100 is a flexible web, pixel structure 100 and the web, including conductor 804 and substrate 802 may be passed between a pair of rollers in a roll-to-roll process to position pixel structure 100 over conductor 804, e.g., to form display 800, as shown in FIG. 8. For some embodiments, adhesive 210 may be cured, e.g., using UV light, as display 800 exits the rollers. Note that display 800 may be flexible for embodiments where conductor 804 and substrate 802 and pixel structure 100 are flexible.

Figure 9:
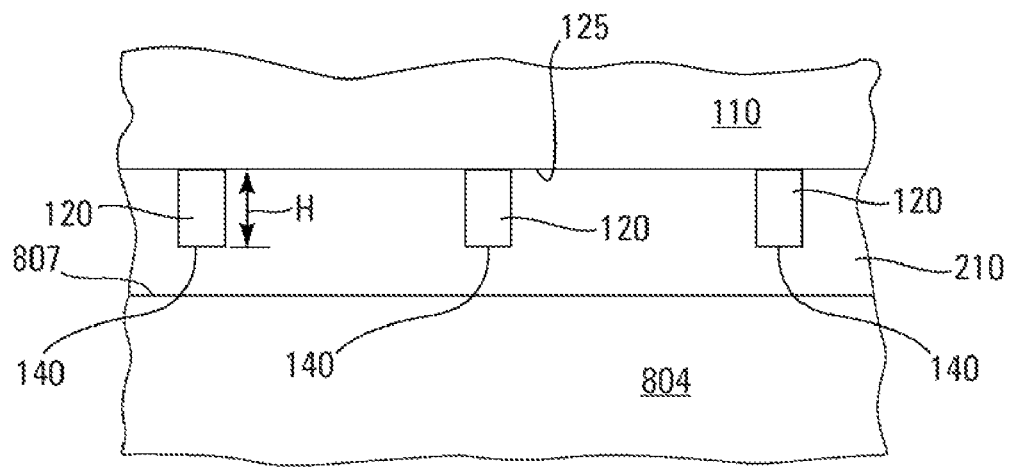
FIG. 9 is a cross-section of a portion of a rib adhered to a portion of conductor, according to another embodiment.

FIG. 9 is a cross-section (with cross-hatching omitted) of a portion of a rib 110 adhered to a portion of conductor 804 by, e.g., cured and substantially dry, adhesive 210. Some of adhesive 210 may be between ends 140 of at least some of the discrete protrusions 120 and conductor 804 and between successively adjacent discrete protrusions 120, e.g., to form a fluid-tight seal between the rib 110 and conductor 804 and thus between adjacent pixels 830.

Protrusions 120 may extend from the surface 125 of a respective rib 110 into adhesive 210 toward conductor 804, and adhesive 210 may extend from at least some of protrusions 120 to successively adjacent protrusions 120, as shown in FIG. 9. For example, adhesive 210 may extend from some of the protrusions 120 to adjacent protrusions 120 on the same or on different ribs 210, as shown in FIG. 2A. Note that substantially all of adhesive 210 is between the surface 125 of each of the ribs 110 and conductor 804. This is due to the ability of protrusions 120 to substantially prevent adhesive 210 from running down the sides of ribs 110, as shown in FIGS. 2A and 2B.

For some embodiments, the height H of protrusions 120 determines the thickness of adhesive 210 on ribs 110 (FIG. 2A) and thus the thickness of adhesive 210 between the surface 125 of ribs 110 and the surface 807 of conductor 804 (FIG. 9). For example, the greater the height H of protrusions 120 the greater the thickness of adhesive 210 on ribs 110, and thus the thickness of adhesive 210 between the surface 125 of ribs 110 and the surface 807 of conductor 804.

Although protrusions 120 are shown to be substantially cylindrical in shape with substantially circular cross-sections, protrusions 120 can have any suitable geometrical shape. For example, protrusions 120 may have a polygonal shaped cross-section, such as square, rectangular, hexagonal, octagonal, pentagonal, etc., may be conical, e.g., with the cross-section decreasing with distance away from the base, etc. For some embodiments, protrusions may be of mixed shapes. For example, the protrusions 120 on a single rib 110 or on adjacent ribs may have different shapes.

For some embodiments, a method of forming a display, such as display 800, is provided. For example one such method may include applying adhesive, such as adhesive 210, to discrete protrusions, such as protrusions 120, protruding from surfaces, such as surfaces 125, of ribs, such as ribs 110, of a pixel structure, such as pixel structure 100; retaining the adhesive between adjacent discrete protrusions using the surface tension of the adhesive; and fastening the pixel structure to a conductor, such as conductor 804, using the adhesive retained between the adjacent discrete protrusions.

Applying adhesive to the discrete protrusions may include wicking the adhesive between the adjacent discrete protrusions in a direction from ends, such as ends 140, of the adjacent discrete protrusions toward the surface 125 of a respective rib in response to contacting the adhesive with the ends 140 of the adjacent discrete protrusions (FIG. 6), and/or applying adhesive to discrete protrusions may include wicking the adhesive from one of the adjacent discrete protrusions to the other of the adjacent discrete protrusions (FIG. 7).

The adhesive may extend from one of the adjacent discrete protrusions to the other of the adjacent discrete protrusions. A thickness of the adhesive on the surface of a respective rib may be determined, at least in part, by a height, such an the height H, of the discrete protrusions extending from the respective rib. Retaining the adhesive between adjacent discrete protrusions using the surface tension of the adhesive may act to substantially prevent the adhesive from extending below the surfaces of at least some of the ribs, as shown in FIG. 2A.

Although specific embodiments have been illustrated and described herein it is manifestly intended that the scope of the claimed subject matter be limited only by the following claims and equivalents thereof.

What is claimed is:

1. A pixel structure, comprising:
   an electrical conductor;
   a dielectric on the electrical conductor;
   a plurality of ribs on the dielectric; and
   a plurality of discrete protrusions protruding from a surface of each of the ribs;
   wherein the plurality ribs define a plurality of compartments on the dielectric; and
   wherein a distance between adjacent protrusions is such that adhesive can be retained between the adjacent protrusions by surface tension of the adhesive.

2. The pixel structure of claim 1, further comprising a plurality of openings that extend through the dielectric to the electrical conductor so as to expose portions of the electrical conductor.

3. The pixel structure of claim 1, further comprising a substrate on which the electrical conductor is located.

4. The pixel structure of claim 1, wherein the distance between the adjacent protrusions is such that the adhesive can be wicked between the adjacent protrusions in a direction from ends of the adjacent protrusions toward a base of the adjacent protrusions.

5. The pixel structure of claim 1, wherein the distance between the adjacent protrusions is such that the adhesive can be wicked from one protrusion of the adjacent protrusions to another protrusion of the adjacent protrusions.

6. The pixel structure of claim 1, wherein the distance between the adjacent protrusions allows the adhesive to extend from one protrusion of the adjacent protrusions to another protrusion of the adjacent protrusions.

7. The pixel structure of claim 1, wherein the surface of a rib of the plurality of ribs and/or a surface of the protrusions protruding from the surface of that rib have a greater surface energy than sides of that rib.

8. The pixel structure of claim 7, wherein the surface of that rib is treated with a laser to have a greater surface energy than the sides of that rib and/or the surface of the protrusions protruding from the surface of that rib have been treated with the laser to have a greater surface energy than the sides of that rib.

9. A display, comprising:
   a first electrical conductor;
   a pixel structure adhered to the first electrical conductor, and comprising:
      a second electrical conductor;
      a dielectric on the second electrical conductor;
      a plurality of ribs on a the dielectric; and
      a plurality of discrete protrusions protruding from a surface of each of the ribs; and
   adhesive between the surface of each of the ribs and the first electrical conductor;
   wherein the discrete protrusions, protruding from the surface of each of the ribs, extend into the adhesive.

10. The display of claim 9, wherein the adhesive extends from at least some of the protrusions to adjacent protrusions on the same or on different ribs.

11. The display of claim 9, wherein the plurality of ribs and first electrical conductor define a plurality of compartments between the first and second electrical conductors.

12. The display of claim 11, wherein each of the compartments contains fluid having electrically charged particles therein.

13. The display of claim 12, further comprising a plurality of openings that extend through the dielectric to the second electrical conductor so that portions of the electrical conductor are exposed to the fluid.

14. The display of claim 9, wherein substantially all of the adhesive is between the surface of each of the ribs and the second electrical conductor.

15. A pixel structure, comprising:
   an electrical conductor;
   a dielectric on the electrical conductor;
   a plurality of ribs on the dielectric; and
   a plurality of discrete protrusions protruding from a surface of each of the ribs;
   wherein the plurality ribs define a plurality of compartments on the dielectric, where the ribs form sidewalls of respective compartments of plurality of compartments; and
   wherein the plurality of discrete protrusions protruding from the surface of each of the ribs is configured to receive adhesive and to prevent the adhesive from flowing into at least a portion of a respective compartment.

16. The pixel structure of claim 15, wherein surfaces of the protrusions of the plurality of discrete protrusions protruding from the surface of each of the ribs are roughened.

17. The pixel structure of claim 15, wherein the plurality of compartments are configured to contain electrophoretic ink.

18. The pixel structure of claim 15, wherein a height of the plurality of discrete protrusions protruding from the surface of each of the ribs ranges from one (1) micron to ten (10) microns.

19. The pixel structure of claim 18, wherein a distance from a discrete protrusion of the plurality of discrete protrusions protruding from the surface of each of the ribs to a successively adjacent discrete protrusion of the plurality of discrete protrusions protruding from the surface of each of the ribs ranges from one (1) micron to 25 microns.

* * * * *

UNITED STATES PATENT AND TRADEMARK OFFICE
CERTIFICATE OF CORRECTION

PATENT NO. : 8,299,708 B2  
APPLICATION NO. : 12/911218  
DATED : October 30, 2012  
INVENTOR(S) : Vincent C Korthuis et al.

Page 1 of 1

It is certified that error appears in the above-identified patent and that said Letters Patent is hereby corrected as shown below:

In column 8, line 55, in Claim 9, delete "a the" and insert -- the --, therefor.

Signed and Sealed this
Nineteenth Day of February, 2013

Teresa Stanek Rea
*Acting Director of the United States Patent and Trademark Office*